UNITED STATES PATENT OFFICE.

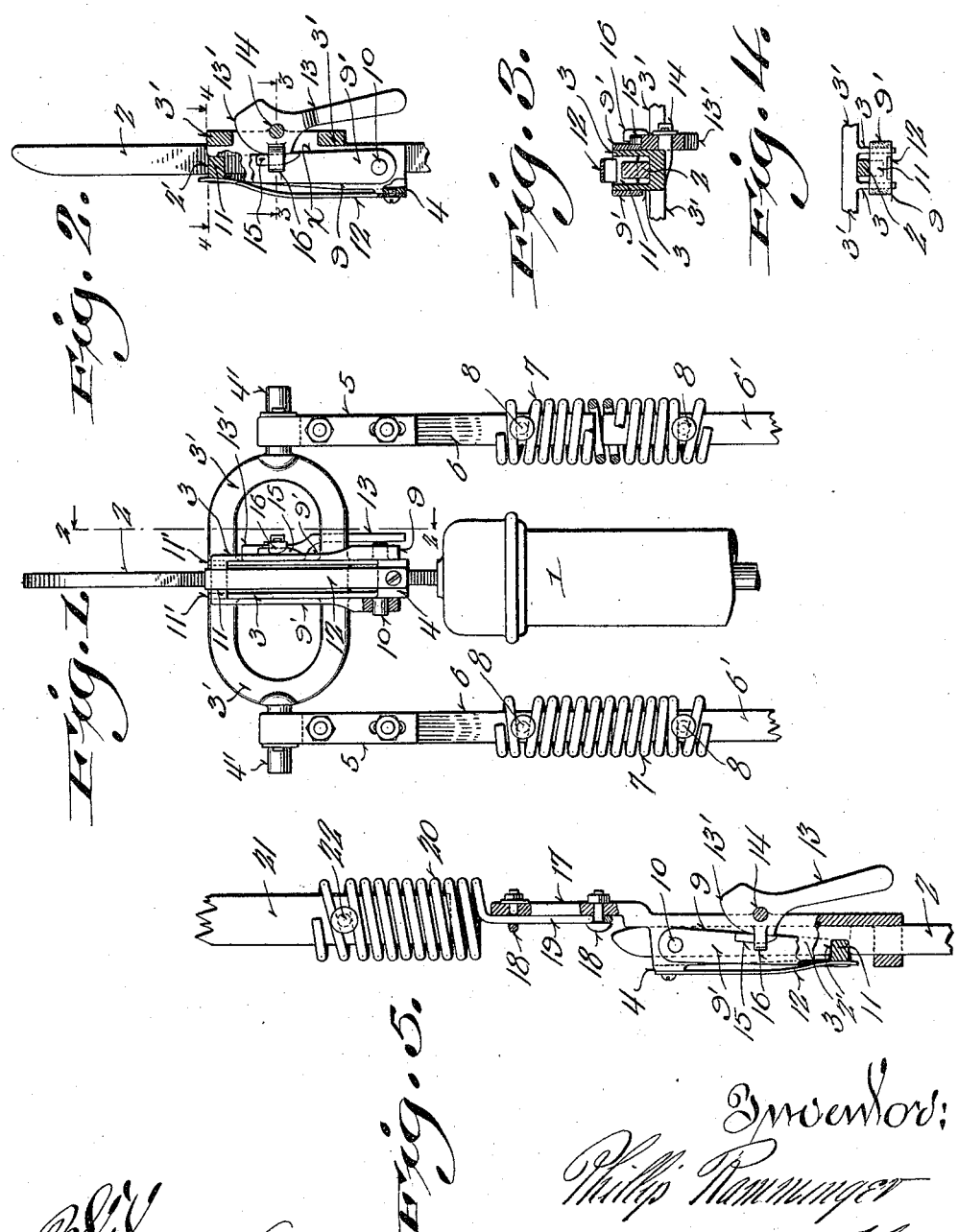

PHILLIP RAMMINGER, OF PLYMOUTH, WISCONSIN.

PUMP-ROD COUPLING.

1,179,756.  Specification of Letters Patent.  Patented Apr. 18, 1916.

Application filed June 5, 1915. Serial No. 32,374.

*To all whom it may concern:*

Be it known that I, PHILLIP RAMMINGER, a citizen of the United States, and resident of Plymouth, in the county of Sheboygan and State of Wisconsin, have invented certain new and useful Improvements in Pump-Rod Couplings; and I do hereby declare that the following is a full, clear, and exact description thereof.

My invention has for its object to provide a simple, economical and effective coupling connection between a pump-rod and a power unit.

With the above object in view the invention consists in what is herein shown, described and claimed.

In the drawings Figure 1 represents a face view of a coupling embodying the features of my invention, the same being shown in connection with the head of a pump and pump-jack pitmen; Fig. 2, a detailed sectional elevation of the coupling mechanism, the section being indicated by line 2—2 of Fig. 1; Figs. 3 and 4, cross-sections of the same, the sections being indicated by lines 3—3 and 4—4 respectively of Fig. 2, and Fig. 5 illustrates the coupling mechanism applicable to a windmill pitman-rod.

Referring by characters to the drawings, 1 represents a pump barrel having extended therefrom the usual pump-rod 2 which is provided with a notch 2′ for locking engagement with a coupling mechanism. The coupling mechanism embodies a housing member having side-walls 3, the lower ends of which side-walls are connected by a bridge-piece 4. The housing bottom in this exemplification of my invention has extending therefrom a skeleton frame 3′ which terminates with trunnions 4′. Mounted upon the trunnions are clip members 5, which clip members are secured to companion pump-jack rod sections 6. These rod sections are connected to main rod sections 6′ by coiled springs 7, the ends of which are secured by bolts 8 to the respective rod sections. The alined ends of the rod sections are spaced apart, as shown, whereby the springs form flexible connections between said rod sections to permit a slight yield and thus cushion the shock of the stroke imparted to the mechanism through the pump-jack, which is not shown as it forms no part of my invention.

A locking dog 9 having cheek-pieces 9′ is pivotally mounted upon the housing, the cheek-pieces being arranged to straddle said housing and are, as shown, pivotally mounted to the walls 3 of the same by trunnions 10 that extend from the walls and engage apertures that are formed in the lower ends of the cheek-pieces of said dog. The dog is provided with a locking nose 11 which connects the cheek-pieces at its upper end and this nose is normally arranged to seat within rectangular notches 11′ that are formed at the upper ends of the housing walls 3. The dog is held in its position of rest within the notches 11′ by a leaf spring 12, the lower end of which is suitably secured to the bridge-piece 4, while its upper free end engages the nose 11. It is apparent that when the dog is in its locking position that the nose 11 also engages the notch 2′ that is formed in the pump-rod. Hence the housing and dog constitute a coupling connection for the rod when it is desired to manipulate said rod for pumping.

In order to firmly lock the dog in its engaged position with the pump-rod notch, or to release the same therefrom, I provide a lever 13, which lever is pivotally mounted upon a pin 14 that extends from one of the housing walls 3. The lever is provided with an eccentric cam-head 13′, the surface of which is arranged to engage the lower edge surface $x$ of the juxtaposed dog cheek-piece. This cheek-piece has extending therefrom a cam-lug 15, which cam-lug is engaged by a locking lip 16 that projects from the head of the lever 13.

From the foregoing description it will be apparent that when the pump-rod is locked to the housing the lever 13 is swung in the position as shown in Fig. 2, in which position the eccentric face of the lever permits the spring 12 to act upon the dog, whereby its nose will engage the notch 2′ when said notch registers with the dog nose. The lever is then swung to the position shown, whereby its tongue 16 will engage the cam-lug 15 and thus permanently lock the dog in the position shown. Should it be desired to uncouple the pump-rod from the power unit, the lever is swung from left to right as shown in Figs. 5 and 2 whereby the tongue 16 will be shifted free of the lug 15 and following this movement the eccentric cam surface of the head 13′ will exert force upon the edge $x$ of the dog cheek-piece whereby said dog will be rocked upon its fulcrum point in opposition to the spring.

Thus the nose of the dog is freed from the pump-rod notch 2' and said dog may be permanently held out of engagement therewith.

Fig. 5 shows the identical coupling mechanism with the exception that the housing, in place of having the skeleton web 3' for a pump-jack connection, is provided with an apertured ear 17. Bolts 18 are arranged to secure the shank 19 of a coiled spring section 20 to the ear and the upper end of said coiled spring section is fitted about a windmill rod 21 and secured thereto by a bolt 22, which bolt passes between coils of the spring and its head firmly engages the opposite coils and firmly locks the spring to the rod. It is manifest that this device also serves as a cushion mechanism similar to that described in connection with the pump-jack rods or pitmen.

I claim:

A coupling connection for pumps comprising a pitman, an open ended housing secured thereto adapted to form a guide rod, a spring-pressed dog having cheek-pieces straddling the housing and a cam-lug offset from one of said cheek-pieces, the dog being in pivotal union with the housing, a rod extending through said housing having notches for engagement with the dog, and a cam-headed lever in pivotal union with the housing having a locking tongue offset therefrom, the said cam-head being arranged to engage the under side of the lug-carrying cheek-piece of the dog when said cam-head lever has moved in one direction whereby disengagement of the dog with the rod notches is effected and when the cam lever is moved in the opposite direction its offset tongue is adapted to engage the dog cam-lug to lock said dog with relation to one of the rod notches.

In testimony that I claim the foregoing I have hereunto set my hand at Milwaukee, in the county of Milwaukee and State of Wisconsin.

PHILLIP RAMMINGER.

Copies of this patent may be obtained for five cents each, by addressing the "Commissioner of Patents, Washington, D. C."